(12) United States Patent
Ohtomo et al.

(10) Patent No.: US 11,512,957 B2
(45) Date of Patent: Nov. 29, 2022

(54) SURVEYING INSTRUMENT

(71) Applicant: TOPCON Corporation, Tokyo-to (JP)

(72) Inventors: Fumio Ohtomo, Saitama (JP); Tetsuji Anai, Tokyo-to (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 304 days.

(21) Appl. No.: 16/896,508

(22) Filed: Jun. 9, 2020

(65) Prior Publication Data
US 2020/0386546 A1    Dec. 10, 2020

(30) Foreign Application Priority Data

Jun. 10, 2019   (JP) .............................. JP2019-107779

(51) Int. Cl.
*G01C 15/00*      (2006.01)
*G01B 11/14*      (2006.01)
*G01S 17/42*      (2006.01)

(52) U.S. Cl.
CPC ............ *G01C 15/004* (2013.01); *G01B 11/14* (2013.01); *G01C 15/002* (2013.01); *G01C 15/008* (2013.01); *G01S 17/42* (2013.01)

(58) Field of Classification Search
CPC .................................................. G01C 15/004
See application file for complete search history.

(56) References Cited

U.S. PATENT DOCUMENTS 7,715,998 B2 *   5/2010   Hayashi .................. G01C 11/06
                                                    702/94
9,109,889 B2 *   8/2015   Soubra ...................... G06T 7/73
(Continued)

FOREIGN PATENT DOCUMENTS

EP    2240740 A1   10/2010
EP    3660451 A1    6/2020
(Continued)

OTHER PUBLICATIONS

European communication dated Oct. 22, 2020 in corresponding European patent application No. 20177929.5.
(Continued)

*Primary Examiner* — Michael A Berns
(74) *Attorney, Agent, or Firm* — Nields, Lemack & Frame, LLC

(57) ABSTRACT

A surveying instrument include a monopod installed on a reference point and a surveying instrument main body provided on the monopod, wherein the surveying instrument main body includes a measuring direction image pickup module which acquires first image including an object, a distance measuring unit which measures a distance to the object, a measuring direction detecting module which detects a measuring direction, a time detector which generates a reference time signal and an arithmetic control module, the arithmetic control module associates a distance measurement result with the reference time signal, associates a measuring direction with the reference time signal, and associates the first image with the reference time signal, associates an image change, the measuring direction, and a distance measurement result with each other based on the reference time signal, calculates a measuring direction in the distance measurement and determines a position of a measurement part of the object.

10 Claims, 12 Drawing Sheets

(56) References Cited

U.S. PATENT DOCUMENTS

| | | | |
|---|---|---|---|
| 10,048,377 B2 * | 8/2018 | Ohtomo | G01C 9/06 |
| 10,088,307 B2 * | 10/2018 | Ohtomo | G01S 17/86 |
| 10,101,441 B2 * | 10/2018 | Ohtomo | G01S 7/4865 |
| 10,185,026 B2 * | 1/2019 | Kumagai | G01S 7/4812 |
| 10,281,580 B2 * | 5/2019 | Ohtomo | G01S 17/48 |
| 10,495,456 B2 * | 12/2019 | Vennegeerts | G01C 25/00 |
| 10,520,307 B2 * | 12/2019 | Ohtomo | G01S 17/86 |
| 2006/0100816 A1 | 5/2006 | Van Toorenburg et al. | |
| 2009/0119050 A1 | 5/2009 | Hayashi | |
| 2012/0330601 A1 | 12/2012 | Soubra et al. | |
| 2014/0309960 A1 | 10/2014 | Vennegeerts et al. | |
| 2016/0238385 A1 | 8/2016 | Ohtomo et al. | |
| 2016/0238708 A1 | 8/2016 | Ohtomo et al. | |
| 2016/0259039 A1 | 9/2016 | Ohtomo et al. | |
| 2017/0131404 A1 | 5/2017 | Ohtomo et al. | |
| 2017/0168142 A1 | 6/2017 | Kumagai et al. | |
| 2017/0227357 A1 | 8/2017 | Ohtomo et al. | |
| 2020/0166340 A1 | 5/2020 | Hinderling | |
| 2020/0386546 A1 * | 12/2020 | Ohtomo | G01C 15/004 |
| 2020/0386547 A1 | 12/2020 | Ohtomo et al. | |

FOREIGN PATENT DOCUMENTS

| | | |
|---|---|---|
| JP | 2016-151422 A | 8/2016 |
| JP | 2016-151423 A | 8/2016 |
| JP | 2016-161411 A | 9/2016 |
| JP | 2017-90244 A | 5/2017 |
| JP | 2017-106813 A | 6/2017 |
| WO | 2009/100773 A1 | 8/2009 |

OTHER PUBLICATIONS

European communication dated Nov. 25, 2020 in co-pending European patent application No. 20177932.9.

Notice of Allowance dated Jun. 1, 2022 in co-pending U.S. Appl. No. 16/896,511.

Office action dated Mar. 11, 2022 in co-pending U.S. Appl. No. 16/896,511.

* cited by examiner

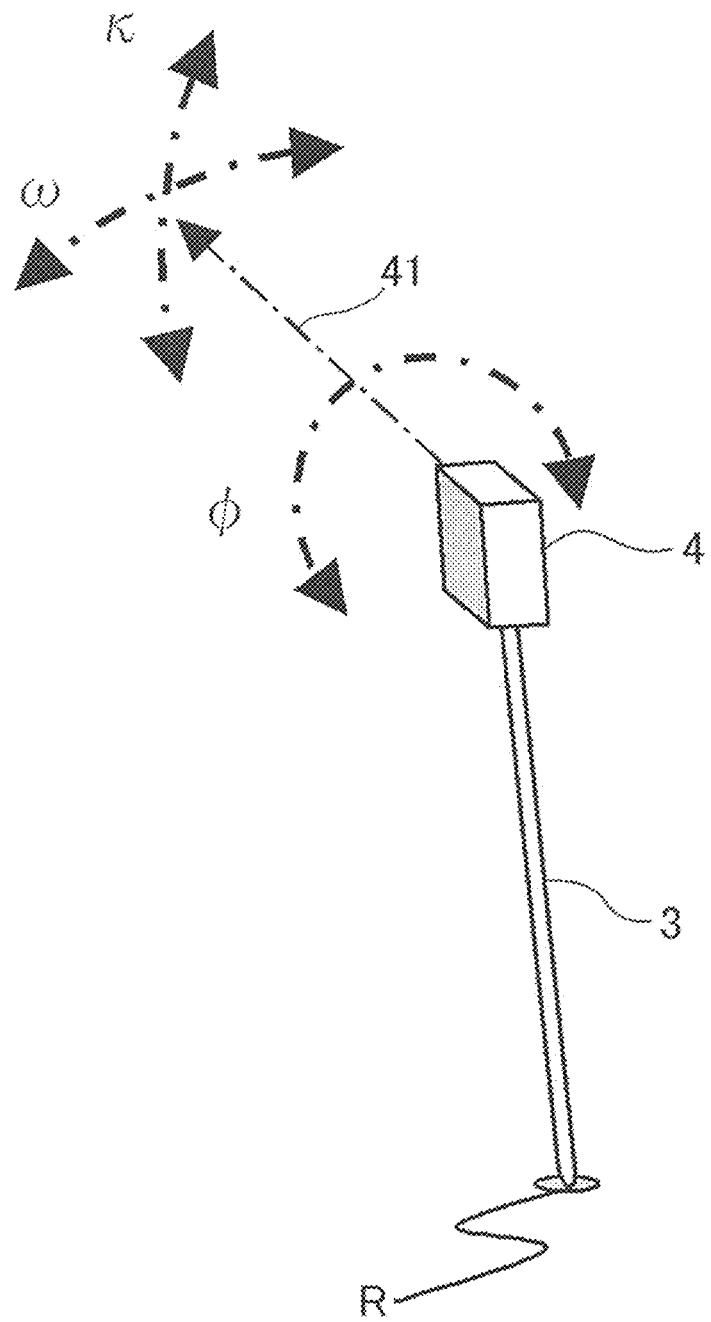

SCAN LOCUS WHEN
NO FLUCTUATION HAS OCCURRED

SCAN LOCUS WHEN
FLUCTUATION HAS OCCURRED

SURVEYING INSTRUMENT

BACKGROUND OF THE INVENTION

The present invention relates to a surveying instrument which can be easily installed.

In case of making a survey with the use of a surveying instrument, the surveying instrument must be first installed on a reference point.

In general, in case of installing the surveying instrument on the reference point, the installation is carried out using a tripod. However, the surveying instrument must be horizontally leveled up on the tripod, and a machine center of the surveying instrument must be accurately positioned on a vertical line running through the reference point. Further, a height from the reference point to the machine center (machine height of the surveying instrument) must be also measured. Thus, a surveying instrument installation work is complicated and requires a time and a skill.

Further, in case of measuring an object which is to be measured and performing the three-dimensional measurement, since the measurement must be performed in a state where the surveying instrument is stabilized, it is important to stably fix the tripod and stably hold the surveying instrument.

SUMMARY OF INVENTION

It is an object of the present invention to provide a surveying instrument which can be easily installed in a short time and does not require a skill in an installation work.

To attain the object as described above, a surveying instrument according to the present invention includes a monopod installed on a reference point and a surveying instrument main body provided at a known position from a lower end of the monopod and at a known angle to the monopod, wherein the surveying instrument main body comprises a measuring direction image pickup module which has a first image pickup optical axis and a distance measuring optical axis and acquires each first image including an object along the first image pickup optical axis, a distance measuring unit for measuring a distance to the object along the distance measuring optical axis, a measuring direction detecting module for detecting a measuring direction of the distance measuring optical axis, a time detector for generating a reference time signal and an arithmetic control module, wherein the arithmetic control module is configured to associate a distance measurement result of the measurement performed by the distance measuring unit with the reference time signal, to associate a measuring direction detected by the measuring direction detecting module with the reference time signal, to acquire the first image at a predetermined time interval by the measuring direction image pickup module, and to associate the acquired first image with the reference time signal, and wherein the arithmetic control module is configured to detect an image change in each first image, to associate the image change, a measuring direction detection result of the measuring direction detecting module, and a distance measurement result with each other based on the reference time signal, to calculate a measuring direction in the distance measurement based on the image change and the measuring direction detection result, and to determine a position of a measurement part of the object.

Further, in the surveying instrument according to a preferred embodiment, the surveying instrument main body has a reference optical axis, the reference optical axis and the first image pickup optical axis have a known relationship, the surveying instrument main body includes an optical axis deflector which deflects the distance measuring optical axis with respect to the reference optical axis, and the measuring direction detecting module is configured to detect a deflecting direction of the distance measuring optical axis to the reference optical axis.

Further, in the surveying instrument according to a preferred embodiment, the surveying instrument main body further comprises a downward image pickup module and an attitude detector, the downward image pickup module acquires each second image including the lower end and a periphery of the monopod, and the arithmetic control module is configured to associate the second image acquired by the downward image pickup module with the reference time signal, to calculate a rotation angle of the monopod around the reference point based on a displacement between the acquired second images, to associate the rotation angle calculated with the reference time signal, to associate an attitude detection result of the attitude detector with the reference time signal, and to determine the three-dimensional coordinates of a measurement part of the object based on the rotation angle of the monopod, the attitude detection result, a distance of the surveying instrument main body from the lower end of the monopod, the calculated measuring direction in the distance measurement, and a measurement result of the distance measuring unit which correspond to the same reference time.

Further, in the surveying instrument according to a preferred embodiment, a display unit such that a measured part is displayed on an image of the object.

Further, in the surveying instrument according to a preferred embodiment, the arithmetic control module is configured to detect outputs from an attitude detector at the predetermined time intervals, to obtain a tilt change of the main body with respect to a time, and to calculate an average in a predetermined time.

Further, in the surveying instrument according to a preferred embodiment, the optical axis deflector includes a pair of independently rotatable optical prisms, and is configured to determine a deflecting direction and a deflection angle of the distance measuring optical axis based on the rotating positions of the optical prisms and a relative rotation angle between the optical prisms, the measuring direction detecting module detects the deflecting direction and the deflection angle of the distance measuring optical axis based on the rotating positions and the relative rotation angle of the pair of optical prisms, the distance measuring unit continuously projects the distance measuring light which is pulsed light, and the arithmetic control module is configured to control rotations of the optical prisms of the optical axis deflector, to continuously deflect the distance measuring optical axis, to perform a two-dimensional scan by the distance measuring light in a necessary scan pattern, to perform the distance measurement every each pulsed light along the scan pattern, to associate a distance measurement result with the reference time signal, associates a deflecting direction and a deflection angle detected by the measuring direction detecting module with the reference time signal, and to acquire the three-dimensional data along the scan pattern.

Further, in the surveying instrument according to a preferred embodiment, when a change in detection result of the attitude detector exceeds a predetermined threshold value, a distance measurement operation before and after the exceedance of the threshold value is stopped.

Furthermore, in the surveying instrument according to a preferred embodiment, the scan pattern is set in such a manner that the scan pattern extends over the first image and the second image, and the arithmetic control module is configured to synthesize the first image and the second image based on the three-dimensional coordinates acquired along the scan pattern.

According to the present invention, a surveying instrument includes a monopod installed on a reference point and a surveying instrument main body provided at a known position from a lower end of the monopod and at a known angle to the monopod, wherein the surveying instrument main body comprises a measuring direction image pickup module which has a first image pickup optical axis and a distance measuring optical axis and acquires each first image including an object along the first image pickup optical axis, a distance measuring unit for measuring a distance to the object along the distance measuring optical axis, a measuring direction detecting module for detecting a measuring direction of the distance measuring optical axis, a time detector for generating a reference time signal and an arithmetic control module, wherein the arithmetic control module is configured to associate a distance measurement result of the measurement performed by the distance measuring unit with the reference time signal, to associate a measuring direction detected by the measuring direction detecting module with the reference time signal, to acquire the first image at a predetermined time interval by the measuring direction image pickup module, and to associate the acquired first image with the reference time signal, and wherein the arithmetic control module is configured to detect an image change in each first image, to associate the image change, a measuring direction detection result of the measuring direction detecting module, and a distance measurement result with each other based on the reference time signal, to calculate a measuring direction in the distance measurement based on the image change and the measuring direction detection result, and to determine a position of a measurement part of the object. As a result, a leveling work is not required, just installing the lower end of the monopod on the reference point enables the measurement, and a position of the measurement region can be accurately determined even in an unstably installed state.

BRIEF DESCRIPTION OF DRAWINGS

FIG. 5A shows a pattern formed in a first half and FIG. 5B shows a pattern formed in a second half.

FIG. 7 is a drawing to show a relationship between the surveying instrument main body and a rotating direction when the surveying instrument main body fluctuates.

DETAILED DESCRIPTION OF THE PREFERRED EMBODIMENT

A description will be given below on an embodiment according to the present invention by referring to the attached drawings.

Figure 1:
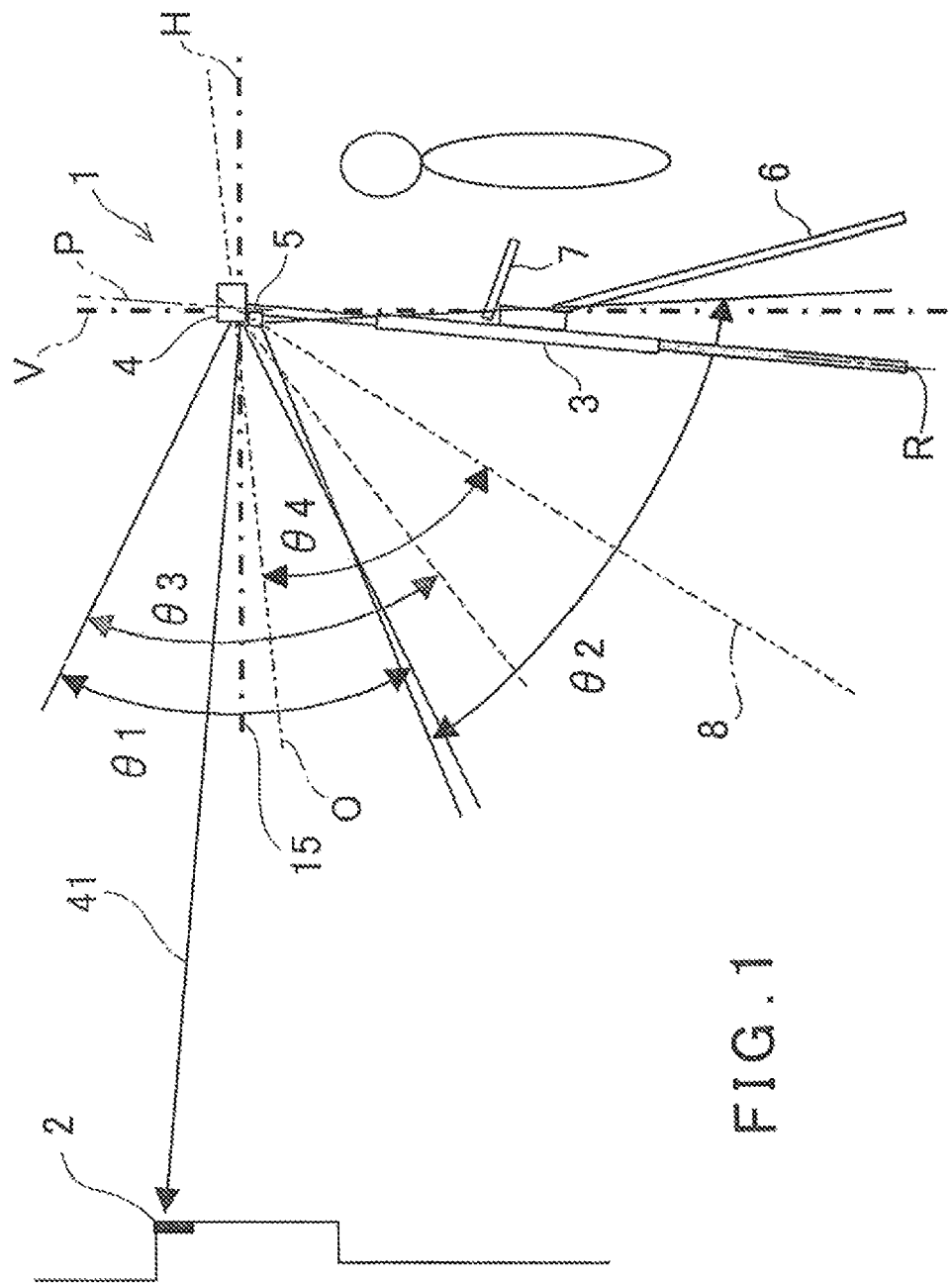
FIG. 1 is a schematical diagram to show an embodiment of the present invention.

FIG. 1 is a drawing showing an outline of the embodiment of the present invention and, in FIG. 1, a reference sign 1 denotes a surveying instrument, and a reference sign 2 denotes an object which is to be measured.

The surveying instrument 1 mainly has a monopod 3, a surveying instrument main body 4 provided on an upper end of the monopod 3, and an operation panel 7, and the operation panel 7 is provided at an appropriate position on the monopod 3, for instance, a position enabling a measurement worker to easily operate at a standing attitude.

The operation panel 7 may be fixedly provided on or attachable to/detachable from the monopod 3. An operation can be performed in a state where the operation panel 7 is disposed to the monopod 3. Further, the operation panel 7 may be separated from the monopod 3 so that the operation panel 7 alone can be operated. The operation panel 7 and the surveying instrument main body 4 can perform the data communication through the various communicating means, such as a wired or wireless means.

Further, one auxiliary leg 6 is foldably disposed at a position on the monopod 3 below the operation panel 7.

A lower end of the monopod 3 is a sharp point, and the lower end is installed on a reference point R (a point which becomes a reference for the measurement). Further, the surveying instrument main body 4 is provided at a known position on the monopod 3. In this embodiment, a distance from the lower end of the monopod 3 to a machine center (a point which becomes a reference for the measurement) of the surveying instrument main body 4 is known.

An optical system of the surveying instrument main body 4 has a reference optical axis O extending in the horizontal direction, and the reference optical axis O is set in such a manner that the reference optical axis O tilts downward at a predetermined angle with respect to a line orthogonal to an axis P of the monopod 3. Therefore, when the monopod 3 is vertically set, the reference optical axis O tilts downward at the predetermined angle with respect to the horizontality.

The auxiliary leg 6 is foldably coupled with the monopod 3 at an upper end thereof, the auxiliary leg 6 is appressed to the monopod 3 in its folded state, and a lock mechanism which holds the appressed state is provided. Alternatively, as a simplified form, a band (not shown) which bundles the monopod 3 and the auxiliary leg 6 may be provided.

The auxiliary leg 6 can rotate on its upper end at a predetermined angle, and can be fixed at a position to which the auxiliary leg 6 has rotated. It is to be noted that a description has been given on a case where the one auxiliary leg 6 is provided, but the two auxiliary legs may be provided. It is case, the monopod 3 can stand by itself.

The surveying instrument main body 4 has a distance measuring unit 13 (to be described later) as an electronic distance meter and a measuring direction image pickup module 14 (to be described later), and a downward image pickup module 5 is provided in the surveying instrument main body 4. A reference optical axis of an optical system of the distance measuring unit 13 is the reference optical axis O. An optical axis of the measuring direction image pickup module 14 (which will be referred to as a first image pickup optical axis 15 hereinafter) tilts upward at a predetermined angle (60, for instance) with respect to the reference optical axis O, and a distance and a positional relationship between the optical axis of the measuring direction image pickup module 14 and the optical axis of the distance measuring unit 13 are known. The distance measuring unit 13 and the measuring direction image pickup module 14 are accommodated in a casing of the surveying instrument main body 4. Further, each of the measuring direction image pickup module 14 and the downward image pickup module 5 has an image pickup element such as a CCD or a CMOS so that the positions of the pixels in each image pickup element can be identified. For example, the measuring direction image pickup module 14 has a pixel coordinates with the first image pickup optical axis 15 as an origin, the downward image pickup module 5 has a pixel coordinates having an optical axis of the downward image pickup module 5 (which will be referred to as a second image pickup optical axis 8) as an origin, and a position of each pixel on an image element is identified using the pixel coordinates respectively. An image signal from the image pickup element contains a signal output from each pixel and the coordinate information associated with the pixel, and the image signal is input to an image processing module 24 (to be described later) through an arithmetic control module 21 (to be described later).

The downward image pickup module 5 is fixed to the casing of the surveying instrument main body 4, and the downward image pickup module 5 (that is, an image forming position of the downward image pickup module 5) is provided at a known position with respect to the machine center of the surveying instrument main body 4. The second image pickup optical axis 8 is directed downward and set at a known angle with respect to the reference optical axis O, and the second image pickup optical axis 8 and the reference optical axis O have a known relationship. It is to be noted that the downward image pickup module 5 may be accommodated in the casing and integrated with the surveying instrument main body 4. Further, as the downward image pickup module 5, for example, a commercially available digital camera may be used.

An angle of view of the measuring direction image pickup module 14 is θ1, an angle of view of the downward image pickup module 5 is θ2, and θ1 and θ2 may be equal to or different from each other. Further, the angle of view of the measuring direction image pickup module 14 and the angle of view of the downward image pickup module 5 may not overlap, but they preferably overlap by a predetermined amount. Further, the angle of view of the downward image pickup module 5 and a direction of the second image pickup optical axis 8 are set in such a manner that the lower end of the monopod 3 is included in an image.

Figure 2:
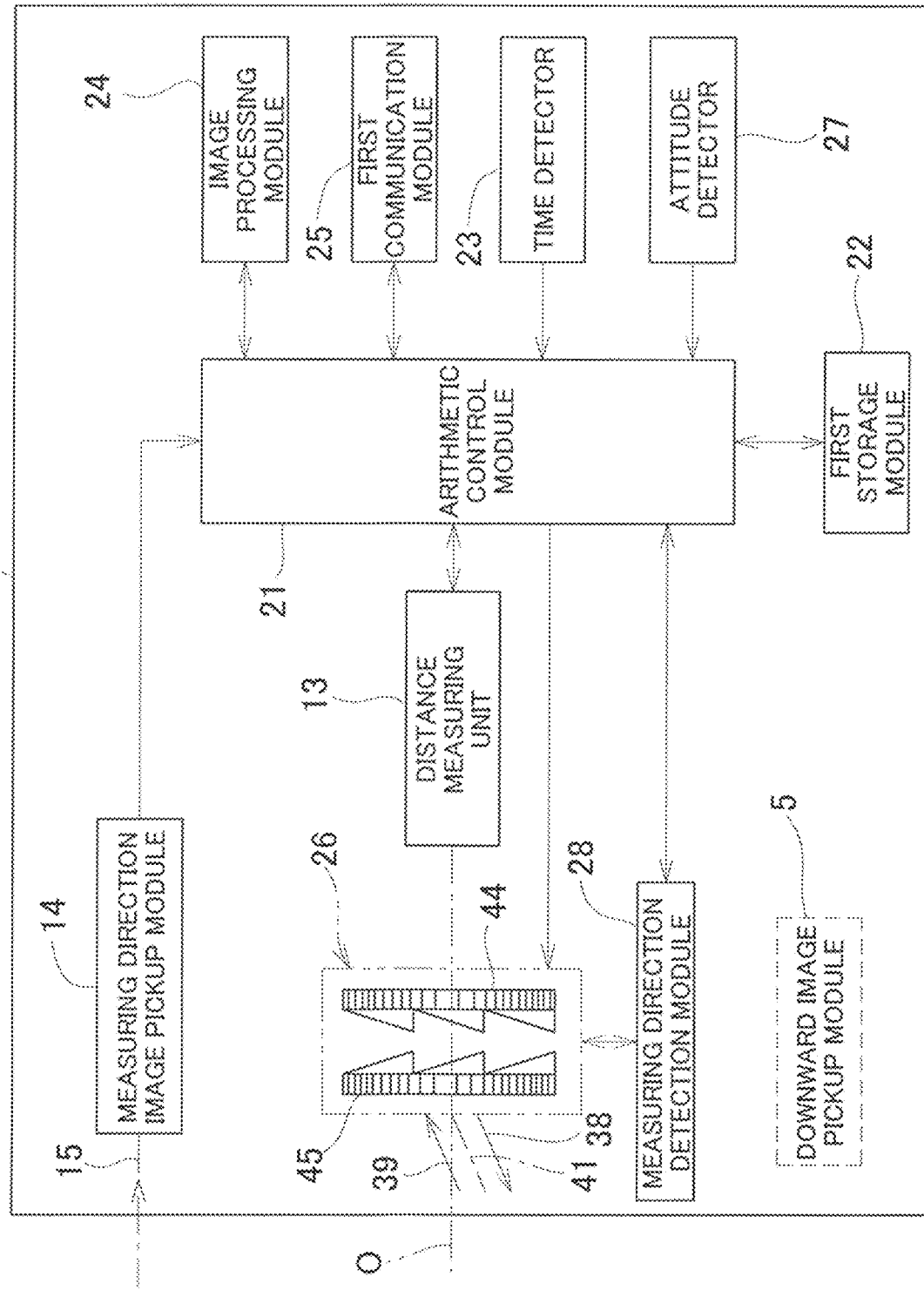
FIG. 2 is a schematical block diagram to show a surveying instrument main body.

A rough configuration of the surveying instrument main body 4 will now be described with reference to FIG. 2.

The surveying instrument main body 4 includes the distance measuring unit 13, the arithmetic control module 21, a first storage module 22, a time detector 23, the image processing module 24, a first communication module 25, an optical axis deflector 26, an attitude detector 27, the measuring direction image pickup module 14, and a measuring direction detecting module 28, and they are accommodated and integrated in a casing 31.

The distance measuring module 13 and the optical axis deflector 26 are arranged on the reference optical axis O. The distance measuring unit 13 has a distance measuring optical axis 41 passing through the center of the optical axis deflector 26. The distance measuring unit 13 emits the distance measuring light 38 on the distance measuring optical axis 41 as a laser beam, receives the reflected distance measuring light 39 which is reflected by the object 2 and enters from the distance measuring optical axis 41, and performs a measurement of the object 2 based on the reflected distance measuring light 39, and the distance measuring unit 13 functions as an electronic distance meter. Further, distance measurement data acquired by the distance measuring unit 13 is associated with a reference time signal as described later and stored in the first storage module 22.

The optical axis deflector 26 deflects the distance measuring optical axis 41, and sights the distance measuring light 38 on the object 2. In a state where the optical axis deflector 26 does not deflect the distance measuring optical axis 41, the distance measuring optical axis 41 coincides with the reference optical axis O. It is to be noted that, as the optical axis deflector 26, the optical axis deflectors disclosed in Japanese Patent Application Publication No. 2016-151422, Japanese Patent Application Publication No. 2017-90244, and Japanese Patent Application Publication No. 2017-106813 can be used.

As the laser beam, any one of the continuous light, the pulsed light, and the intermittent modulated distance measuring light (the burst light) disclosed in Japanese Patent Application Publication No. 2016-161411 may be used. It is to be noted that the pulsed light and the intermitted modulated light will be generically referred to as the pulsed light.

The first communication module 25 transmits an image data acquired by the measuring direction image pickup module 14, an image data processed by the image processing module 24, a distance measurement data acquired by the distance measuring unit 13, and an angle measurement data acquired by the measuring direction detecting module 28 to the operation panel 5, and receives operation commands from the operation panel 5. The first communication module 25 communicates with a second communication module 67 as described later through a necessary communicating means, such as a wired or wireless means.

The first storage module 22 stores the various kinds of programs; for instance, a control program for picking up image, a image processing program, a communication program, an operation command creation program, a tilt angle calculation program configured to calculate a tilt angle and a tilt direction of the monopod 3 based on an attitude detection result from the attitude detector 27 and further calculate a vertical component of the tilt angle (a tilt angle of the monopod 3 in a front-and-rear direction to the object 2) and a horizontal component of the tilt angle (a tilt angle of the monopod 3 in a left-and-right direction to the object 2), a correction program configured to correct a direction of an image acquired based on the calculated tilt, a measurement program configured to perform the distance measurement, a deflection control program configured to control a deflecting operation of the optical axis deflector 26, an image processing program configured to perform the processing, for instance, synthesis of images acquired by the downward image pickup module 5 and an image acquired by the measuring direction image pickup module 14, and a calculation program configured to execute a various kinds of calculations. Further, in the first storage module 22, a various kinds of data, for instance, a distance measurement data, an angle measurement data, and an image data are stored.

The arithmetic control module 21 develops and executes the various kinds of programs in correspondence with an operation state of the surveying instrument main body 4, performs, for instance, a control over the distance measuring unit 13, a control over the optical axis deflector 26, a control over the measuring direction image pickup module 14, and a control over the downward image pickup module 5, and carries out the distance measurement. It is to be noted that, as the arithmetic control module 21, a CPU dedicated to this instrument or a general-purpose CPU is used.

Further, as the first storage module 22, the various kinds of storing means, for instance, an HDD as a magnetic storage device, a built-in memory, a memory card, a USB memory, and the like are used as a semiconductor storage device. The first storage module 22 may be attachable to or detachable from the casing 31. Alternatively, the first storage module 22 may be configured to transmit data to an external storage device or an external data processing device via a desired communicating means.

The time detector 23 generates a reference time signal. The reference time signal may be a clock signal continuously generated from the start of measurement or a timer may be used. Further the time detector 23 may include a GNSS receiver and the reference time signal is a GNSS time acquired from the GNSS receiver.

The reference time signal is input to the arithmetic control module 21, and the arithmetic control module 21 associates the various kinds of data and the detection results, for instance, the distance measurement data, the image data, a measuring direction detection result, and an attitude detection result with the reference time signal.

A description will now be given on the optical axis deflector 26. It is to be noted that, regarding the optical axis deflector 26, the optical axis deflectors and the like disclosed in, for instance, Japanese Patent Application Laid-Open 2016-151422, 2017-90244, 2017-106813 can be used.

The optical axis deflector 26 includes a pair of optical prisms 44 and 45. The optical prisms 44 and 45 are formed into circular shapes with the same diameter, concentrically arranged on the distance measuring optical axis 41 in such a manner that they become orthogonal to the distance measuring optical axis 41, and arranged in parallel at a predetermined interval. When the respective rotations of the optical prisms 44 and 45 are controlled, the distance measuring optical axis 41 can be deflected at an arbitrary angle ranging from 0° to a maximum deflection angle with respect to the reference optical axis O.

Further, when the optical prisms 44 and 45 are continuously driven and continuously deflected while continuously performing the irradiation of the distance measuring light 38, the distance measuring light 38 can be scanned two-dimensionally in a predetermined pattern.

The measuring direction detecting module 28 detects the respective rotation angles of the optical prisms 44 and 45, and detects a measuring direction of the distance measuring optical axis 41, that is, a deflection angle and a deflecting direction of the distance measuring optical axis 41 to the reference optical axis O in real time. Therefore, a relationship between the reference optical axis O and the distance measuring optical axis 41 in the distance measurement can be calculated.

A measuring direction detection result (an angle measurement result) is associated with a distance measurement result and input to the arithmetic control module 21, and the arithmetic control module 21 associates the distance measurement result, the measuring direction detection result, and the reference time signal with each other and stores them in the first storage module 22. The distance measurement and the angle measurement are associated with each other in accordance with each pulsed-light when the distance measuring light 38 is pulse-emitted or in accordance with each intermitted distance measuring light when the distance measuring light 38 is burst-emitted, and further the distance measurement and the angle measurement are associated with the reference time signal.

Next, a description will be given on the attitude detector 27. The attitude detector 27 detects a tilt angle of the casing 31 (that is, the surveying instrument main body 4) with respect to the horizontality in real time. As the attitude detector 27, for instance, an acceleration sensor is used. Alternatively, an attitude detection device disclosed in Japanese Patent Application Publication No. 2016-151423 can be also used. A detection result of the attitude detector 27 is input to the arithmetic control module 21, associated with a reference time, and stored in the first storage module 22.

The measuring direction image pickup module 14 has the first image pickup optical axis 15. The measuring direction image pickup module 14 is a camera having an angle of view which is substantially equal to a maximum deflection angle θ/2 (for instance, ±30°) of the optical prisms 44 and 45, for example, 50° to 60°. A relationship between the first image pickup optical axis 15 and the reference optical axis O is known (for example, an angle formed between both the optical axes is known).

Further, the measuring direction image pickup module 14 can acquire still images, continuous images, or video images in real time. Each image (a first image) acquired by the measuring direction image pickup module 14 is transmitted to the operation panel 7, and displayed in a display unit 68 (to a described later) of the operation panel 7. A worker can observe a image displayed in the display unit 68 and perform a measurement work.

The arithmetic control module 21 controls the image pickup of the measuring direction image pickup module 14. When the measuring direction image pickup module 14 acquires the video image or the continuous image, the arithmetic control module 21 synchronizes a timing to acquire a frame image constituting the video image or the continuous image with a timing to perform a scan by the surveying instrument main body 4.

As described above, the arithmetic control module 21 also associates an image with measurement data (distance measurement data, angle measurement data) based on a time. Further, the arithmetic control module 21 synchronously controls over an image pickup timing of the measuring direction image pickup module 14 and the downward image pickup module 5 via the first communication module 25 and a second communication module 67 (to be described later).

A position of each pixel in an image pickup element of the measuring direction image pickup module 14 can be identified on the image pickup element, and a relationship between the first image pickup optical axis 15 and the reference optical axis O is known. Therefore, a measuring position provided by the distance measuring unit 13 can be associated with a position on the image pickup element. An image signal output from the image pickup element includes the coordinate information associated with a signal output from the pixel and the pixel, and is input to the image processing module 24 via the arithmetic control module 21.

The downward image pickup module 5 will now be described.

The downward image pickup module 5 is electrically connected with the surveying instrument main body 4, and the image data acquired by the downward image pickup module 5 is input to the surveying instrument main body 4.

The image pickup of the downward image pickup module 5 is synchronously controlled with the image pickup of the measuring direction image pickup module 14 and the distance measurement of the distance measuring unit 13 by the arithmetic control module 21. The downward image pickup module 5 is provided at a known position with respect to the machine center of the surveying instrument main body 4, and a distance between the downward image pickup module 5 and the lower end of the monopod 3 is also known.

Further, the second image pickup optical axis 8 of the downward image pickup module 5 has a known relationship with the reference optical axis O. The image data acquired by the downward image pickup module 5 is associated with the image data acquired by the measuring direction image pickup module 14 and the distance measurement data measured by the distance measuring unit 13 with the use of the arithmetic control module 21, also associated with a reference time, and stored in the first storage module 22.

Figure 3:
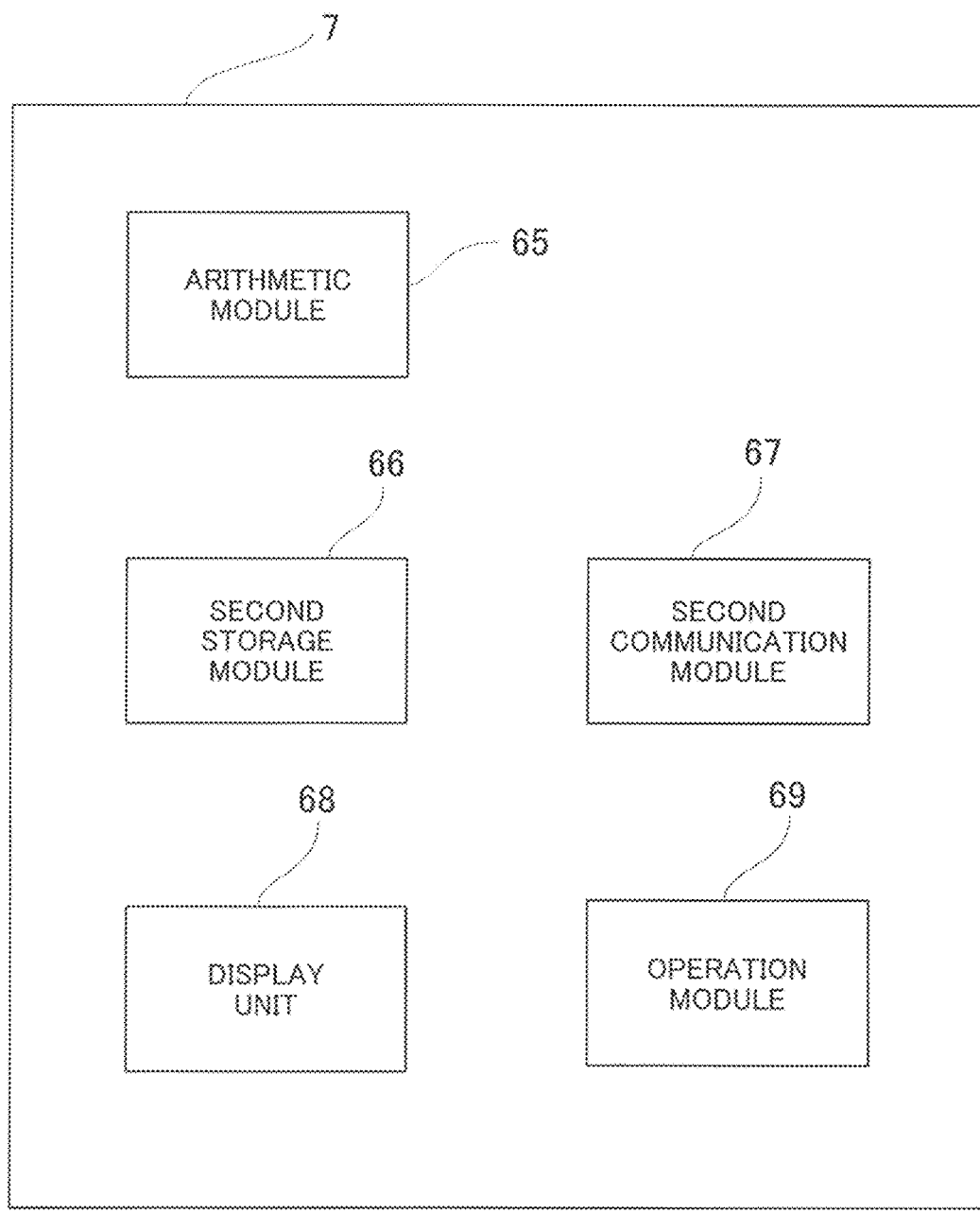
FIG. 3 is a schematical block diagram of an operation panel.

The operation panel 7 will now be described briefly with reference to FIG. 3.

As described above, the operation panel 7 may be fixedly provided to or may be attachable to/detachable from the monopod 3. Further, in a case where the operation panel 7 is attachable/detachable, a worker may remove the operation panel 7 from the monopod 3, and may be able to hold and operate the operation panel 7 in a lone state.

The operation panel 7 mainly includes an arithmetic module 65, a second storage module 66, the second communication module 67, the display unit 68, and an operation module 69. It is to be noted that the display unit 68 may be configured as a touch panel so that the display unit 68 can also function as the operation module 69. Further, in a case where the display unit 68 is the touch panel, the operation module 69 may be omitted.

The second storage module 66 stores the various kinds of programs, for instance, a communication program configured to communicate with the surveying instrument main body 4, a display program configured to display on the display unit 68 image acquired by the downward image pickup module 5, image acquired by the measuring direction image pickup module 14 and a measurement information measured by the distance measuring unit 13, and a command creation program configured to create the commands for the surveying instrument main body 4 from the information operated by operation module 69.

The arithmetic module 65 executes controlling over the display in the display unit 68, creating a command, and controlling over the second communication module 67 with the use of the programs.

The second communication module 67 transmits or receives the data, for instance, the measurement data, the image data, and the command data to or from the image processing module 24 via the arithmetic control module 21 and the first communication module 25.

The display unit 68 displays a measurement state, a measurement result, and the like of the surveying instrument main body 4 based on the received measurement data and image data. Further, the display unit 68 displays the images acquired by the downward image pickup module 5 and the measuring direction image pickup module 14. The various kinds of commands, for instance, a command concerning the measurement work can be input from the operation module 69 to the surveying instrument main body 4. It is to be noted that the display unit 68 may be configured as a touch panel so that it can also function as the operation module 69.

As the operation panel 7, for example, a smartphone or a tablet may be used. Further, the operation panel 7 may be used as a data collector.

An example of the action of the optical axis deflector 26 will now be described with reference to FIG. 4, FIG. 5A and FIG. 5B.

A two-dimensional scan pattern provided by the optical axis deflector 26 is determined by the number-of-rotation relationship between the optical prism 44 and the optical prism 45.

Figure 4:
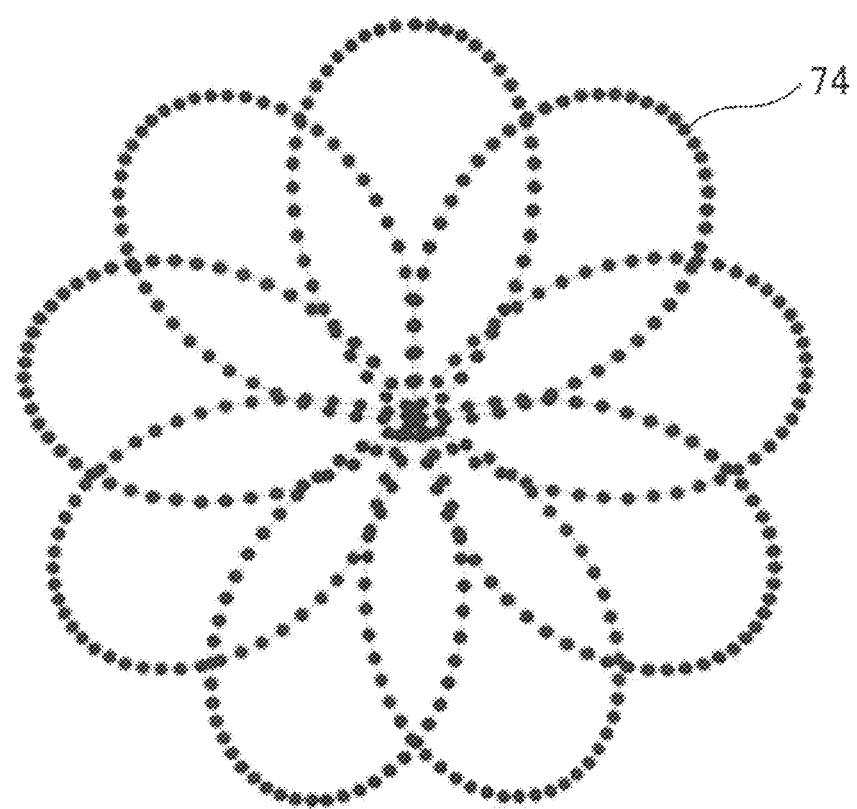
FIG. 4 is a drawing showing a flower petal pattern which is an example of a two-dimensional pattern.

For example, when one optical prism 44 is rotated in a forward direction at 17.5 Hz and the other optical prism 45 is rotated in a reverse direction at 5 Hz, such a flower petal-like two-dimensional closed loop scan pattern 74 as shown in FIG. 4 can be obtained.

Figure 5A:
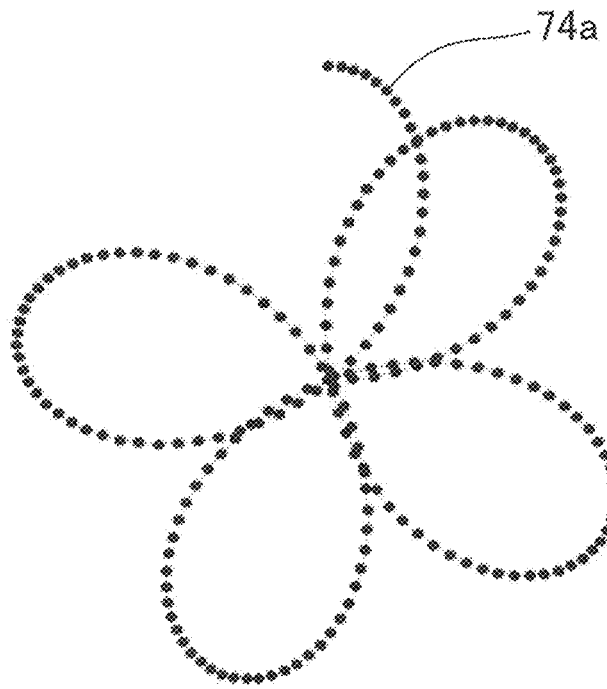
FIG. 5A and FIG. 5B are drawings to show a process of forming the flower petal pattern.
Figure 5B:
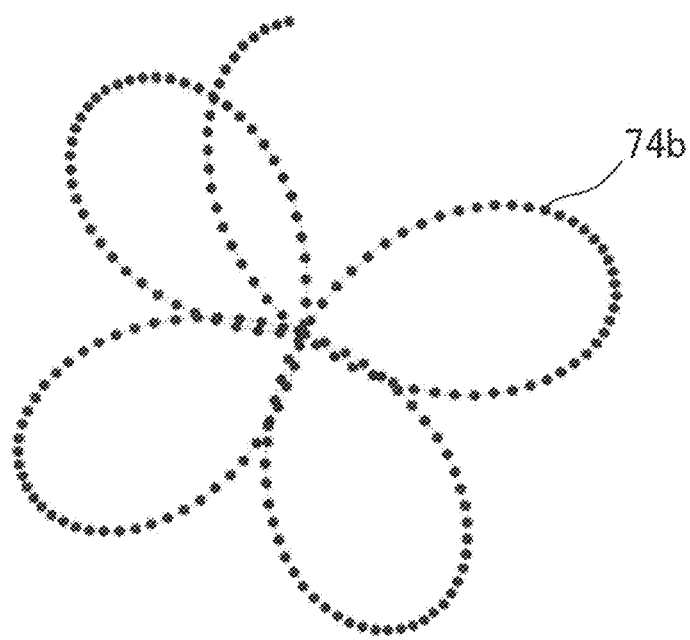

In case of rotating the optical prisms 44 and 45 under the above-described conditions, such a first-half locus 74a of a flower petal pattern 74 as shown in FIG. 5A can be acquired in the first half (0 to 0.2 sec). Further, in the second half (0.2 to 0.4 sec), such a second-half locus 74b of the flower petal pattern 74 as shown in FIG. 5B can be acquired. When the first-half locus 74a is combined with the second-half locus 74b, the flower petal pattern 74 which is 0.4 sec per cycle is formed.

Further, the flower petal pattern 74 has been formed in an entire deflection range of the optical axis deflector 26. On the other hand, when the rotations of the optical prism 44 and the optical prism 45 are controlled in such a manner that a predetermine deflection angle is maintained with respect to an optical axis (a deflected optical axis) deflected by the optical axis deflector 26, a circular scan is performed around the deflected optical axis.

It is to be noted that a part of the entire deflection range can be locally scanned. A local scan is a two-dimensional closed loop scan which is performed by small reciprocating rotations within the part of the entire deflection range. A shape of the local scan can be an arbitrary shape by an individual control of the optical prisms 44 and 45 without being restricted to the circle.

Figure 6:
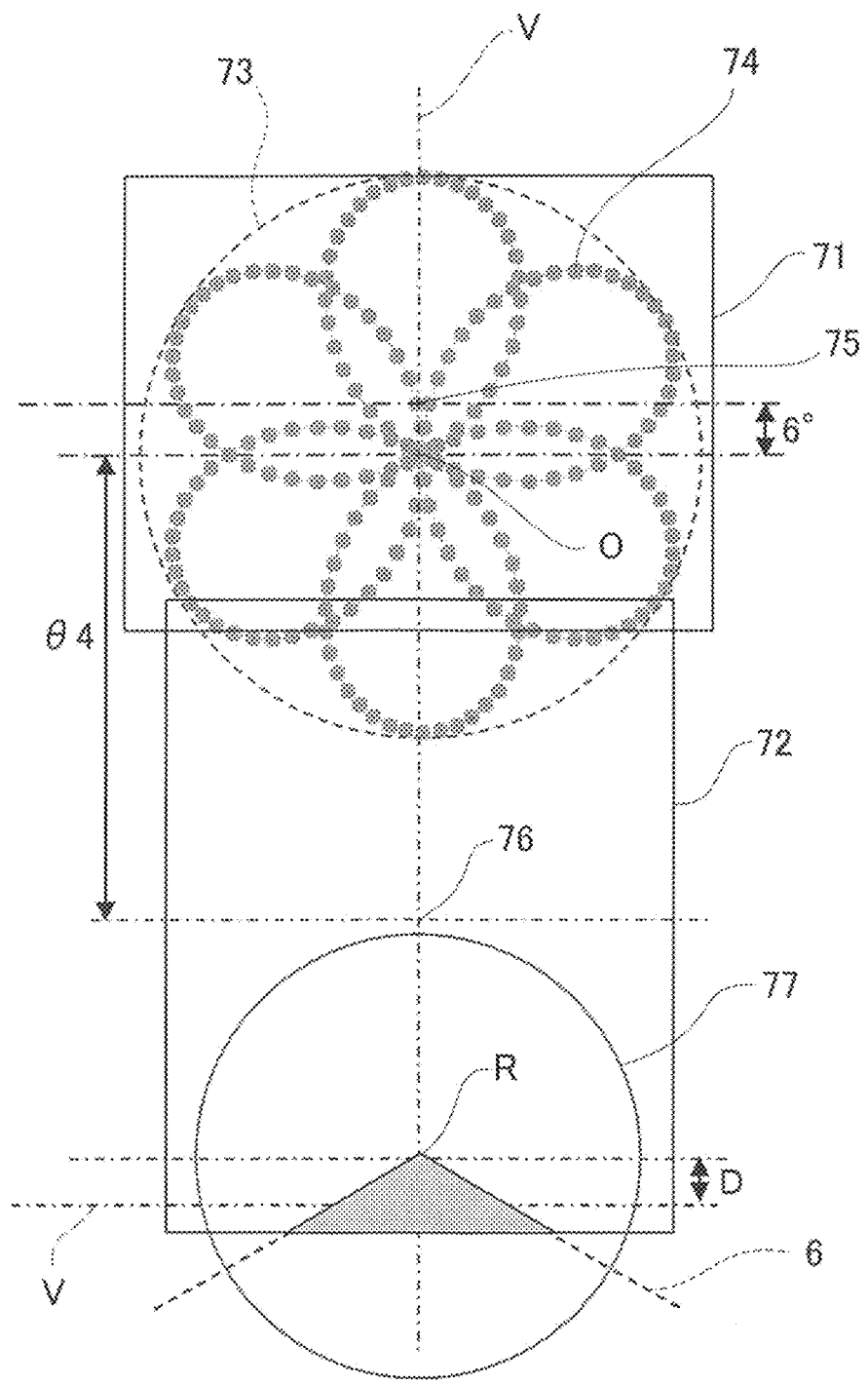
FIG. 6 is a drawing to show a relationship between images acquired by a measuring direction image pickup module and a downward image pickup module and a scan locus provided by the surveying instrument main body.

FIG. 6 shows a relationship between a first image acquisition range of the measuring direction image pickup module 14, a second image acquisition range of the downward image pickup module 5, and the scan.

In FIG. 6, a reference sign 71 denotes a first image acquisition range of the measuring direction image pickup module 14, a reference sign 72 denotes a second image acquisition range of the downward image pickup module 5, a reference sign 73 denotes a deflection range of the distance measuring optical axis 41 provided by the optical axis deflector 26, and a reference sign 74 denotes a locus in a case where the optical deflector 26 scans the distance measuring light in a flower petal pattern while irradiating the distance measuring light at plural times. Dots shown in the flower petal pattern 74 represent irradiation points of the distance measuring light at plural times. That is, the dots represent the measuring points on a locus of the flower petal pattern 74.

Further, a reference sign 75 denotes an image center of the first image acquisition range 71 (the image center 75 coincides with the first image pickup optical axis 15), and a reference sign 76 denotes an image center of the second image acquisition range 72 (the image center 76 coincides with the second image pickup optical axis 8).

Further, in FIG. 1, a reference sign 61 denotes an angle of view of the measuring direction image pickup module 14, a reference sign θ2 denotes an angle of view of the downward image pickup module 5, and θ3 denotes a scan range of the surveying instrument main body 4, respectively.

Further, in FIG. 6, an angle between the first image pickup optical axis 15 and the second image pickup optical axis 8 is set to, for instance, 60°, and the reference optical axis O tilts downward at, for instance, 6° with respect to the first image pickup optical axis 15. That is, θ4 becomes 54°. Further, the drawing also shows a state where the monopod 3 tilts rearward (a direction away from the object 2) at 5° and is held.

The second image pickup optical axis 8 is directed downward, and the image acquisition range of the downward image pickup module 5 is set in such a manner that the lower end of the monopod 3 is included. Therefore, an image acquired by the downward image pickup module 5 includes the reference point R, and an image of a predetermined range on a measurement worker's side (a range of approximately 80° in the drawing) is also included.

The rotation detection around the reference point R as a center can be acquired by setting a rotation detection image 77 with a predetermined radius around the reference point R as a center and by detecting rotational displacements of the rotation detection image 77 before and after the rotation. It is to be note that, as the rotation displacement, a rotation displacement of a second image before and after the rotation may be detected.

Then, as shown in FIG. 1, when the object 2 is measured by the surveying instrument main body 4, a slope distance to the object 2 is measured by the distance measuring unit 13. Further, a deflection angle of the reference optical axis O (6° in FIG. 6) with respect to the first image pickup optical axis 15 and a deflection angle of the distance measuring optical axis 41 with respect to the reference optical axis O are detected by the measuring direction detecting module 28. Further, a tilt angle of the surveying instrument main body 4 with respect to the horizontality is detected by the attitude detector 27. Further, a tilt angle of the distance measuring optical axis 41 with respect to the horizontality is calculated by the arithmetic control module 21, and a horizontal rotation change of the surveying instrument main body 4 is detected based on the rotation detection image 77.

The arithmetic control module 21 corrects the slope distance to a horizontal distance based on the tilt angle of the distance measuring optical axis 41 with respect to the horizontality, and calculates a direction angle based on the tilt angle of the distance measuring optical axis 41 with respect to the horizontality and the detected horizontal angle. Further, since the length of the monopod 3 and an inclination of the monopod 3 with respect to the first image pickup optical axis 15 are known, the three-dimensional coordinates of the object 2 with reference to the lower end of the monopod 3 (that is, the reference point R) are acquired by the arithmetic control module 21.

As shown in FIG. 6, the optical axis deflector 26 can freely deflect the distance measuring optical axis 41 in the range of the deflection range 73. As described above, by controlling the rotations of the optical prism 44 and the optical prism 45, the optical axis deflector 26 enables the distance measuring light to scan with the locus of the flower petal pattern 74. By the irradiating the pulsed distance measuring light in a scan process, it is possible to acquire the three-dimensional distance measurement data of the respective irradiation points (the respective measuring points) along the locus of the flower petal pattern 74. The dots on the flower petal pattern 74 represent the measuring points. Further, a first image and a second image are acquired in synchronization with the scan.

When a frame rate is 10 frames/sec and a light emission rate is 10 KHz (10,000 times/sec), the arithmetic control module 21 synchronously controls emitting in such a manner that pulsed distance measuring lights are emitted 1,000 times every time when a frame image is acquired. Further, an acquisition time of the frame image and a time of the distance measurement using the pulsed distance measuring light are associated with the reference time, respectively. It is to be noted that, in the acquisition of the first image and the second image, the image acquisition by the global shutter (the simultaneous pickup processing) is preferred when the image pickup element is a CMOS.

It is to be noted that, if the acquisition time of the frame image and the time of the distance measurement using the pulsed distance measuring light have been accurately associated with the reference time, the synchronization of the scan and the acquisition of the first image and the second image does not have to be strict.

Further, in case of synthesizing the first image acquired by the measuring direction image pickup module 14 and the second image acquired by the downward image pickup module 5, a synthesis can be performed with the use of an overlap portion of both the images. Alternatively, as shown in FIG. 6, a scan can be performed in such a manner that a part of the flower petal pattern 74 is included in the second image acquisition range 72, and the first image and the second image can be immediately synthesized by using the distance measurement data along the locus in the first image and the distance measurement data along the locus in the second image.

By synthesizing the first image and the second image, since the first image with an extensive range including from the reference point R to the object 2 can be acquired, a confirmation of the measurement range and the measuring position can be facilitated, and the workability can be improved. Further, when the first image or a synthesized image is associated with the data along the locus obtained by the two-dimensional scan, an image with the three-dimensional data can be acquired. Further, a distance measurement result is displayed in the display unit 68. Further, when the distance measurement result is superimposed on the first image and the second image and displayed in the display unit 68, it is possible to confirm which region (a measurement region) of the object is measured, and a progress state of the measurement and other can be confirmed.

The measurement operation, and the distance measurement result and the image with the three-dimensional data which are acquired by the measurement operation relate to a case where the surveying instrument main body 4 is stably held.

However, the surveying instrument main body 4 is supported by the monopod 3, and the monopod 3 is held by a worker. Therefore, the surveying instrument main body 4 is not in a perfectly stable state, and the monopod 3 slightly shakes in practice.

Considering a state where the surveying instrument main body 4 is supported by the monopod 3, a displacement of the surveying instrument main body 4 is a rotation displacement with reference to the lower end of the monopod 3, there is almost no displacement of the surveying instrument main body 4 in the up-and-down direction, and a parallel displacement component is considered small. Therefore, as shown in FIG. 7, a displacement of the surveying instrument main body 4 with respect to the time can be basically considered to be a rotation ($\phi$) within a plane orthogonal to the distance measuring optical axis 41, a rotation ($\kappa$) within a vertical plane including the distance measuring optical axis 41, and a rotation ($\omega$) within a horizontal plane including the distance measuring optical axis 41. Although a change in tilt of the surveying instrument main body 4 can be likewise obtained by a detection of the attitude detector 27, generally, it is difficult for the attitude detector 27 to detect a tilt with respect to the true verticality when an acceleration fluctuates. Since an influence on an acceleration component caused due to the fluctuation can be alleviated by the averaging, the averaging of approximately several seconds is required. Further, since the attitude detector 27 cannot detect the rotation ($\omega$), a method using the images is also used.

Figure 8A:
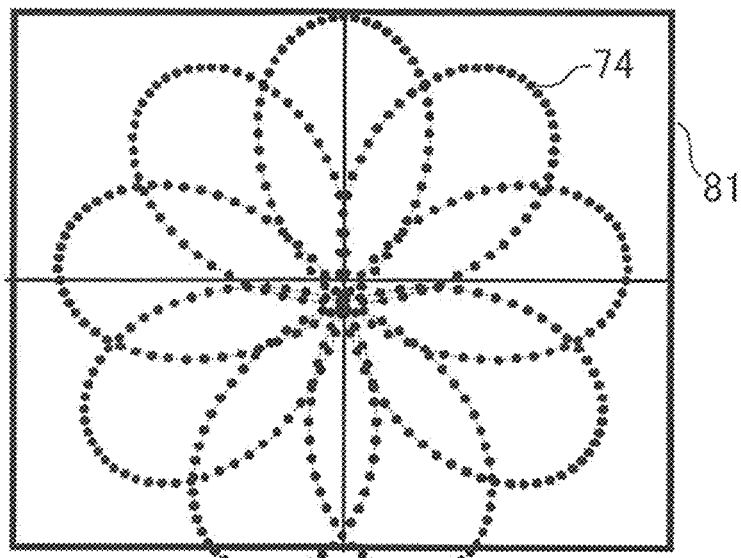
FIG. 8A and FIG. 8B are drawings to show respectively a relationship between an image and a scan locus.

In a state where the scan is performed with the use of the distance measuring light and the measurement is carried out, when the surveying instrument main body 4 does not fluctuate, a fluctuation of the scan locus 74, which is acquired as shown in FIG. 8(A), to an image 81 does not occur, and the clear scan locus 74 is formed.

Figure 8B:
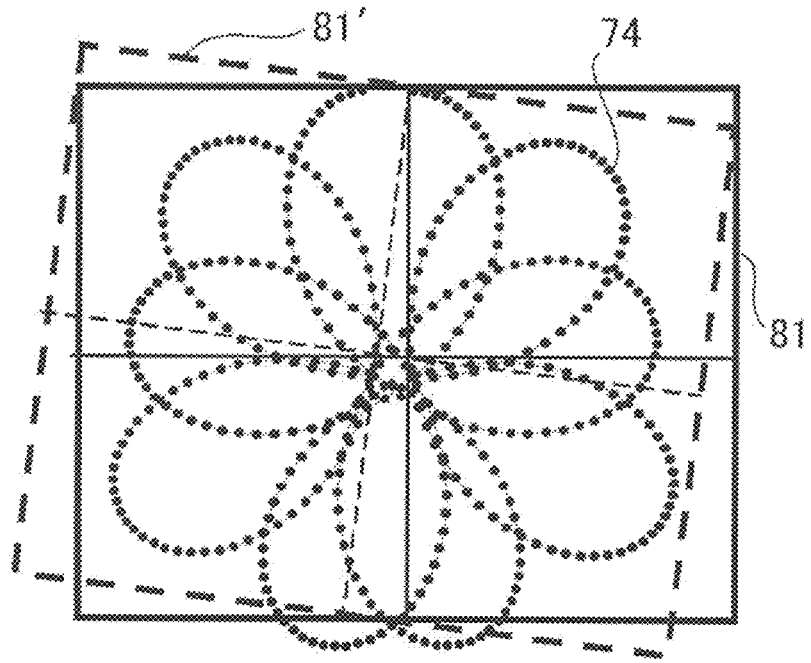

On the other hand, in a case where the surveying instrument main body 4 is unstable and the surveying instrument main body 4 fluctuated, that is, rotated (the angle: $\kappa$, $\omega$, $\phi$) during the scan, since the first image pickup optical axis 15 of the measuring direction image pickup module 14 also integrally rotates ($\kappa$, $\omega$, $\phi$), the image 81 as acquired rotates by ($\kappa$, $\omega$, $\phi$) against the object. In FIG. 8B, a reference sign 81' represents a rotated image.

By detecting a displacement of the image this rotation (the angle: $\kappa$, $\omega$, $\phi$) can be acquired in real time. As a typical method for detecting the displacement of the image, a matching based on a feature extraction, a phase restriction method, or a rotation invariant phase restriction method is known. In the image, $\kappa$ is detected as a longitudinal direction, $\omega$ is detected as a lateral direction, and $\phi$ is detected as a rotation. Further, the rotation (the angle: $\kappa$, $\omega$, $\phi$) can be averaged by a predetermined time interval, and an average rotation angle can be calculated.

Since the measuring direction image pickup module 14, the downward image pickup module 5 and the optical axis deflector 26 are integrally constituted, a relationship between the scan locus 74 and an angle of view (a field of view) of the measuring direction image pickup module 14 is fixed. Therefore, if there is a displacement (a rotation) between the acquired images (that is, if there is a displacement of an image pickup position with respect to the object), the scan locus is also displace by a displacement equal to the displacement between the acquired images, to the object.

FIG. 8B shows an example where a displacement has occurred between a first half (0 to 0.2 sec) and a second half (0.2 to 0.4 sec) of the flower petal pattern 74. This is a case where a displacement (a rotation ($\kappa$, $\omega$, $\phi$)) has occurred between an acquired image 81 in the first half of the flower petal pattern 74 and an acquired image 81' in the second half of the same, and in FIG. 8B, the image 81 shown by a solid line represents a state before the displacement, and the image 81' shown by a dotted line represents a state where the image has rotated ($\kappa$, $\omega$, $\phi$) with respect to the original image 81. The locus 74 also is displaced corresponding to the displacement of the image 81'.

Figure 9:
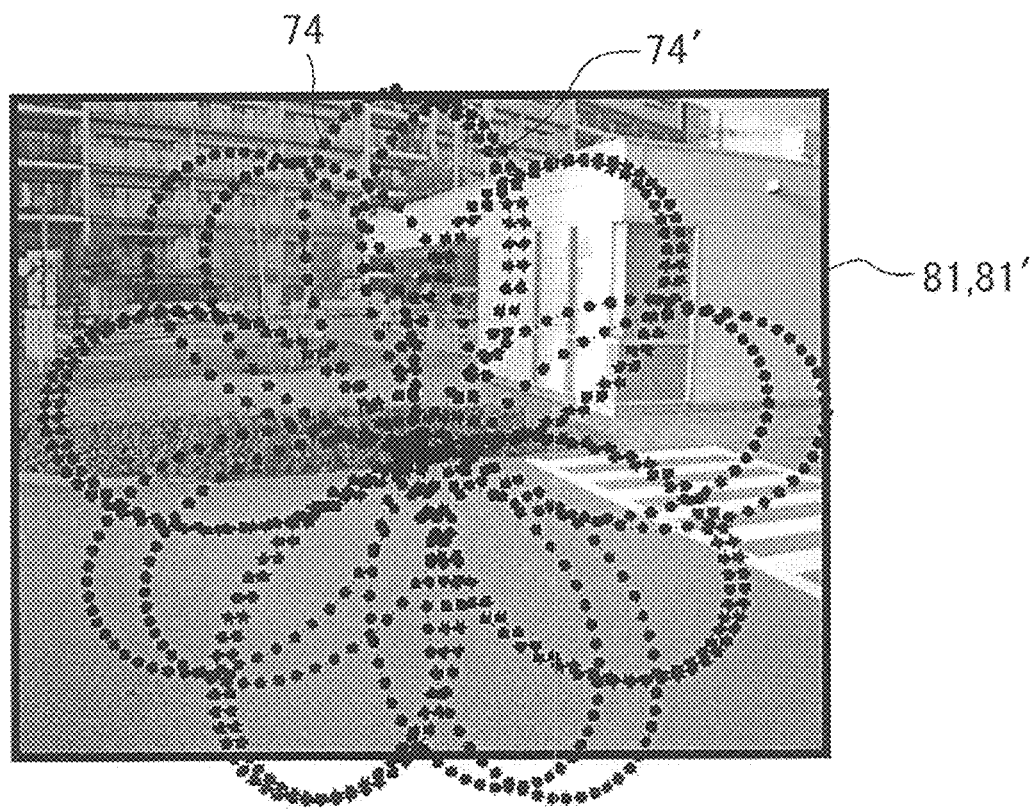
FIG. 9 is a drawing to show a relationship between a synthesized image of a previous image and a subsequent image and a scan locus.

FIG. 9 intensively shows, on the image of the image 81, the locus in the first half of the flower petal pattern 74 and a locus determined by correcting the locus in the second half of the flower petal pattern 74 by an amount corresponding to the displacement (the rotation ($\kappa$, $\omega$, $\phi$)).

The correction of the measurement points measured between an image and a subsequent image can be obtained by a calculation.

Figure 10:
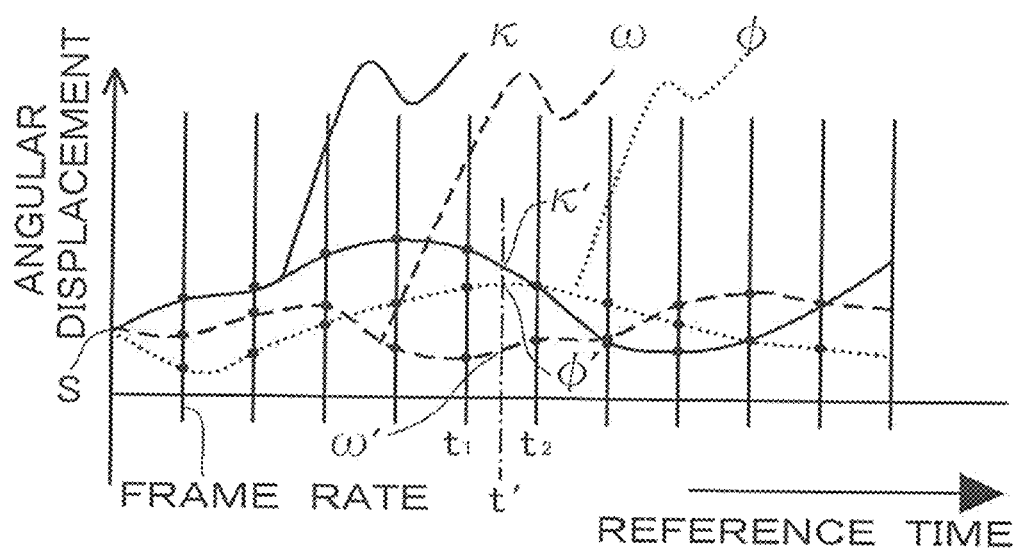
FIG. 10 is a graph to show changes in angular displacements $\kappa$, $\omega$, and $\phi$ when the surveying instrument main body fluctuates.

A description will be given below by referring to FIG. 10. In FIG. 10, an axis of abscissa represents a time, and an axis of ordinate represents the angles of $\kappa$, $\omega$, and $\phi$. In the drawing, a description will be given on a case where a frame rate is 10 frames/sec, and a light emission rate of the pulsed distance measuring light is 10 KHz (10,000 times/sec). It is to be noted that, needless to say, the frame rate and the light emission rate are appropriately changed depending on the performance of the instrument and a measurement environment. For instance, the frame rate may be changed in a frames/sec to b frames/sec range, and the light emission rate c kHz to d kHz range.

The distance measurement is performed 1,000 times each time an image is acquired every 0.1 second. The acquisition of the image and the distance measurement are synchronized with each other.

By detecting the displacement of the image, the rotation angles ($\kappa$, $\omega$, $\phi$) of a subsequent image to a previous image (that is, $\kappa$, $\omega$, and $\phi$ of the distance measuring optical axis 41) is obtained. Therefore, a distance measurement result can be calculated and corrected based on $\kappa$, $\omega$, and $\phi$.

Further, when the rotation angles ($\kappa$, $\omega$, $\phi$) are obtained every time an image is acquired, the changes of ($\kappa$, $\omega$, $\phi$) to the time are obtained, and as shown in FIG. 10 the approximate curves which include $\kappa$, $\omega$, and $\phi$ respectively can be created. Therefore, the rotation angles can be obtained from the approximate curves by the interpolation. For example, as to a time t' between a time t1 and a time t2, $\kappa'$, $\omega'$, and $\phi'$ can be obtained from the approximate curves. Based on $\kappa'$, $\omega'$, and $\phi'$, a position of each measuring point can be identified, and an elevation angle and a horizontal angle can be calculated.

It is to be noted that a start point S is based on a tilt angle obtained by averaging the detection results of the attitude detector 27 for several seconds.

The changes of ($\kappa$, $\omega$, $\phi$) between the images may be approximated by straight lines respectively.

In the above description, the distance measurement is synchronized with the image acquisition, but if ($\kappa$, $\omega$, $\phi$) curves are obtained, $\kappa$, $\omega$ and $\phi$ at a measurement time can be obtained from the ($\kappa$, $\omega$, $\phi$) curves based on the measurement time and hence the distance measurement and the image acquisition do not have to be synchronized with each other.

As described above, the surveying instrument main body 4 has the time detector 23 which generates a reference time signal, and a distance measurement time in the distance measuring unit 13, image acquisition times in respective the measuring direction image pickup module 14 and the downward image pickup module 5, a detection time in the measuring direction detecting module 28, and an attitude detection time in the attitude detector 27 are associated with a common reference time, respectively. Therefore, with regard to the data stored in the first storage module 22, by selecting the distance measurement data, the image data, the direction detection data and the like, corresponding to the same reference time, it is possible to acquire the data acquired at the same time.

κ, ω, and φ of all distance measurement points are obtained from the approximate curves by an interpolation at each distance measurement time based on all the distance measurement times. Thereby, a position of each measuring point is determined by correcting calculating, and it is possible to calculate elevation angle and a horizontal angle and to calculate three-dimensional coordinates of each measuring point.

Figure 11:
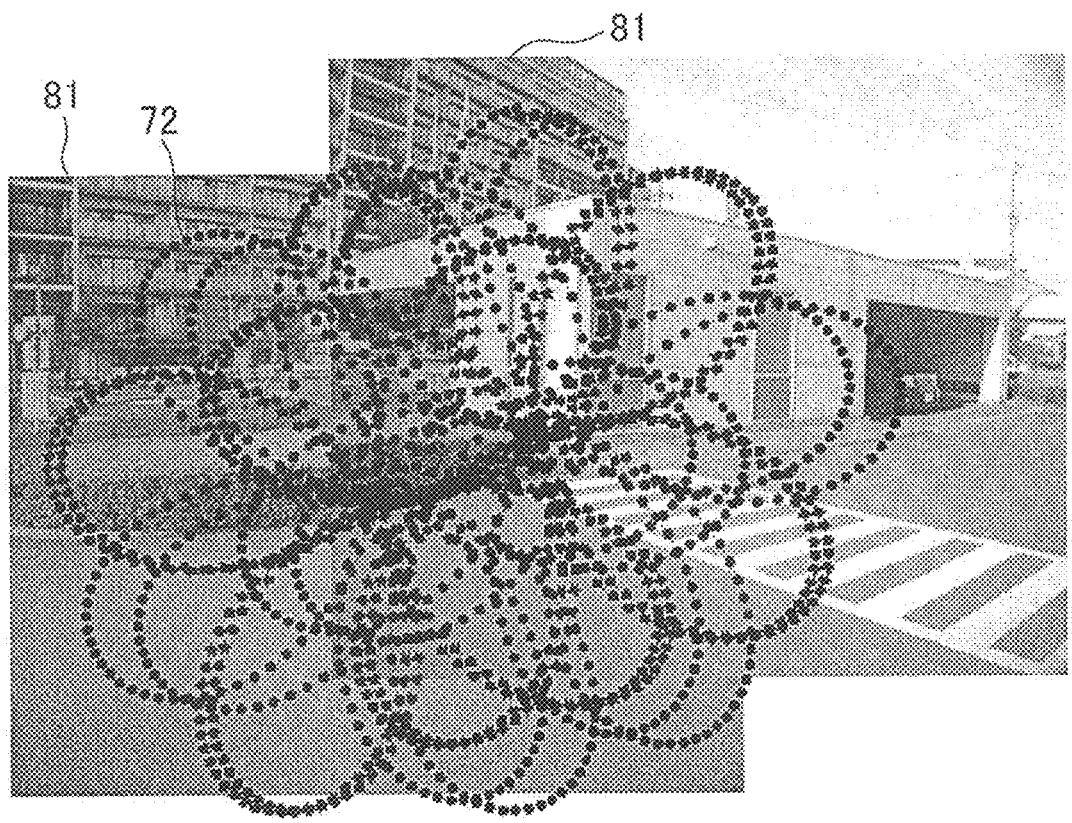
FIG. 11 is a drawing to show a relationship between a coupled image of images with different image pickup directions and scan loci.

FIG. 11 intensively shows scan loci, which have been determined after the correction, on two coupled images.

As described above, in this embodiment, since the determination of a position of each measuring point, the calculations of an elevation angle and a horizontal angle, and the calculation of the three-dimensional coordinates are performed after the measurement, the measurement can be performed even if the surveying instrument main body 4 is not stably held.

Then, there is a case where the surveying instrument main body 4 is rotated around the axis of the monopod 3, or the monopod 3 is largely tilted, and a measuring direction and a measuring range are changed. Alternatively, when an attitude has greatly changed due to an external factor, a clear image in a clear measuring direction cannot be acquired, and the acquisition of κ, ω, and φ becomes difficult. In this case, the arithmetic control module 21 judges a rapid change in attitude of the surveying instrument main body 4 based on a detection result of the attitude detector 27 and a detection result of the rotation detection image 77, stops measuring, and restarts measuring when the rapid change in attitude no longer appears.

The presence/absence of the rapid change in attitude may be determined with the use of the threshold values provided to a change rate of a detection result of the attitude detector 27 or a change rate of a detection result of the rotation detection image 77.

Figure 12:
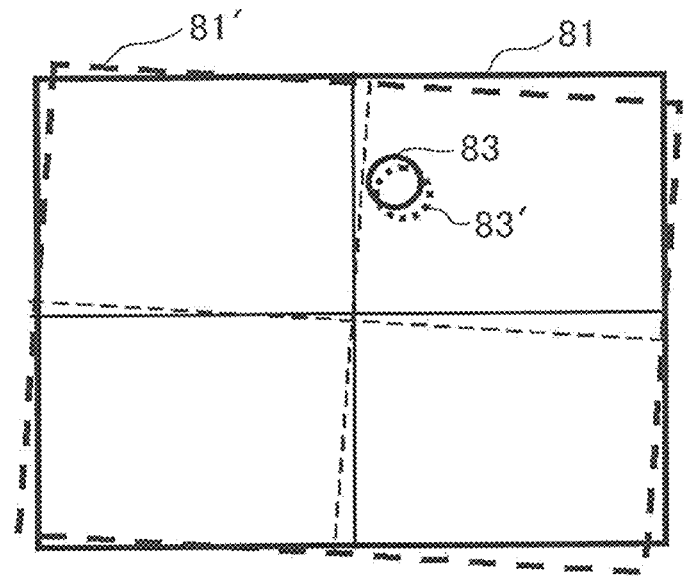
FIG. 12 is a drawing to show a relationship between images and scan loci when local circular scans are performed as a scan pattern.

It is to be noted that, in case of performing the determination processing for a correction of a scan locus based on the image change detection, an arbitrary scan pattern can be selected and, for example, as shown in FIG. 12, a local circular pattern 83 may be selected. In FIG. 12, a reference sign 81 denotes an image before a fluctuation, a reference sign 81' denotes an image after the fluctuation, a reference sign 83 denotes a circular pattern locus before the fluctuation, and a reference sign 83' denotes a circular pattern locus after the fluctuation.

Figure 13:
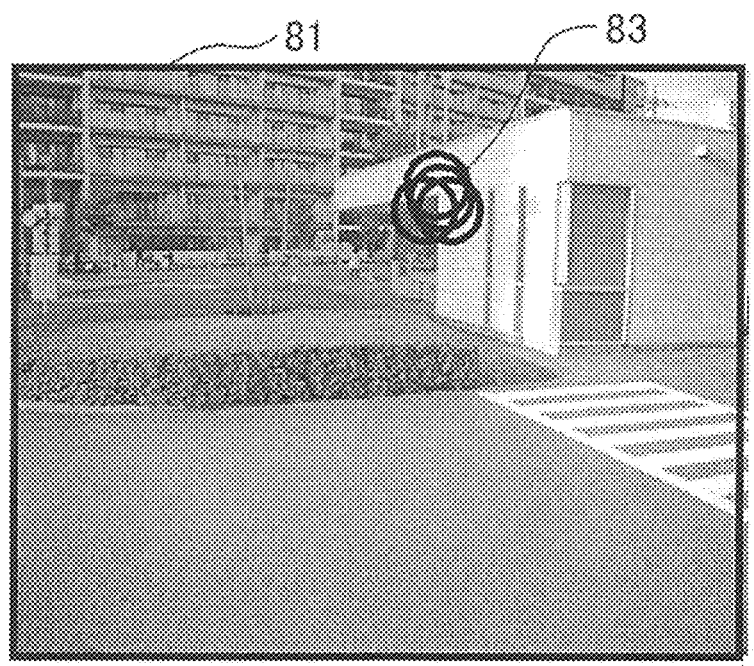
FIG. 13 is a drawing to show loci of a plurality of local circular patterns aggregate in one image.

FIG. 13 shows a state where a scan locus determined after correcting the local circular pattern 83 is intensively shown on one image 81.

Figure 14:
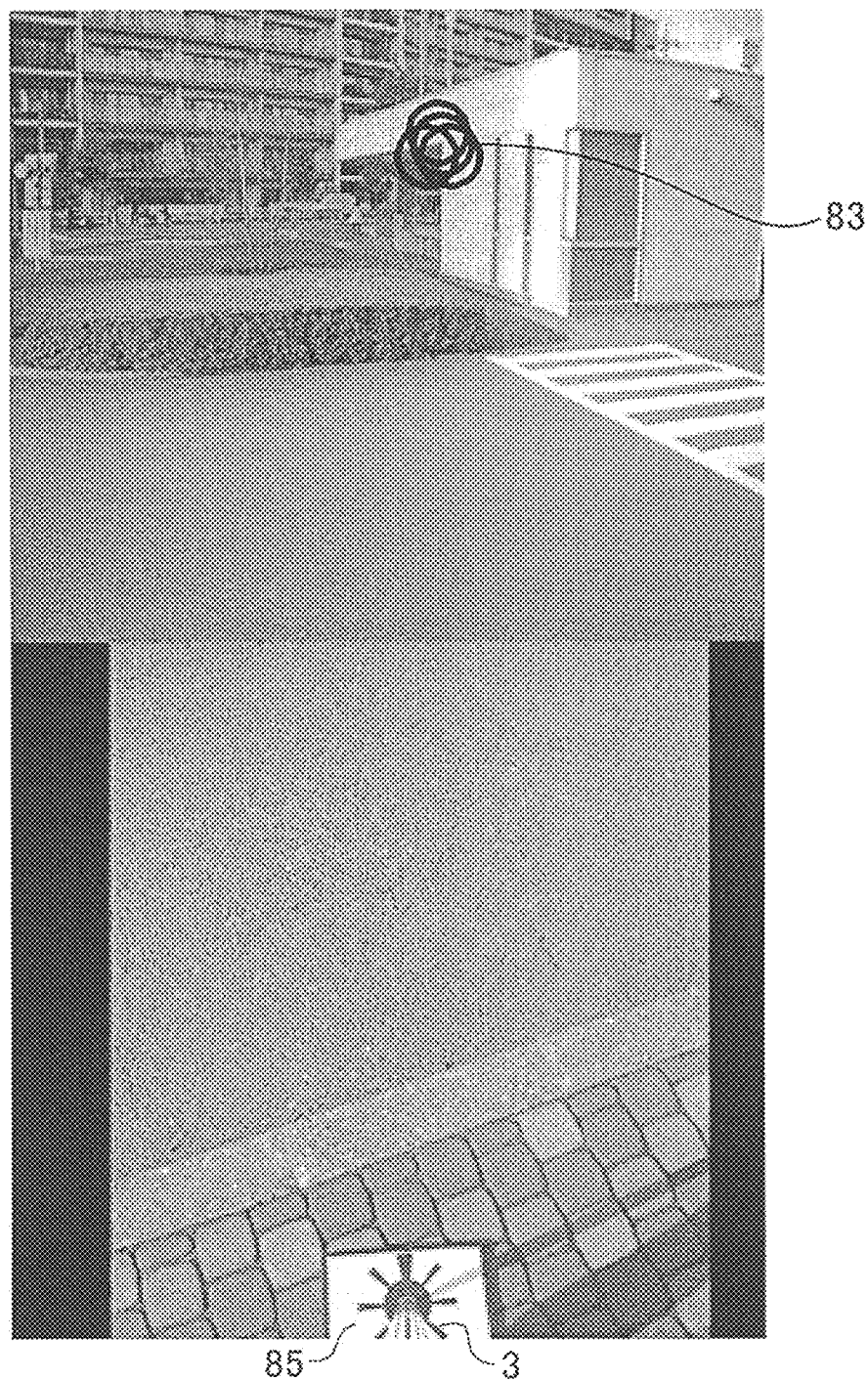
FIG. 14 is a drawing to show a relationship between a coupled image of a first image and a second image, scan loci, and a reference plate.

Further, FIG. 14 shows a coupled image of a first image and a second image which is acquired by the downward image pickup module 5 and, in the coupled imaged, a relationship between the lower end of the monopod 3 and the scan locus determined after correcting the locus of the local scan 83 is shown. Further, in the drawing, a reference sign 85 denotes a reference plate 85 installed on the reference point R.

In the above embodiment the measurement is carried out by performing a scan using the distance measuring light, but the scan may be fixed, a measurement part may be determined, and then the measurement may be performed in the measurement part. In this case, the measurement part and its vicinity can be measured.

The invention claimed is:

1. A surveying instrument comprising: a monopod installed on a reference point and a surveying instrument main body provided at a known position from a lower end of said monopod and at a known angle to said monopod, wherein said surveying instrument main body comprises a measuring direction image pickup module which has a first image pickup optical axis and a distance measuring optical axis and acquires each first image including an object along said first image pickup optical axis, a distance measuring unit for measuring a distance to said object along said distance measuring optical axis, a measuring direction detecting module for detecting a measuring direction of said distance measuring optical axis, a time detector for generating a reference time signal and an arithmetic control module, wherein said arithmetic control module is configured to associate a distance measurement result of a measurement performed by said distance measuring unit with said reference time signal, to associate the measuring direction detected by said measuring direction detecting module with said reference time signal, to acquire each first image at a predetermined time interval by said measuring direction image pickup module, and to associate each first image with said reference time signal, and wherein said arithmetic control module is configured to detect an image change in each first image, to associate said image change, a measuring direction detection result of said measuring direction detecting module, and a distance measurement result with each other based on said reference time signal, to calculate a measuring direction in the distance measurement result based on said image change and said measuring direction detection result, and to determine a position of a measurement part of said object.

2. The surveying instrument according to claim 1, wherein said surveying instrument main body has a reference optical axis, said reference optical axis and said first image pickup optical axis have a known relationship, said surveying instrument main body includes an optical axis deflector which deflects said distance measuring optical axis with respect to said reference optical axis, and said measuring direction detecting module is configured to detect a deflecting direction of said distance measuring optical axis to said reference optical axis.

3. The surveying instrument according to claim 2, wherein said surveying instrument main body further comprises a downward image pickup module and an attitude detector, said downward image pickup module acquires each second image including the lower end of said monopod and a periphery of said monopod, and said arithmetic control module is configured to associate each second image acquired by said downward image pickup module with said reference time signal, to calculate a rotation angle of said monopod around said reference point based on a displacement between each second image, to associate said rotation angle of said monopod calculated with said reference time signal, to associate an attitude detection result of said attitude detector with said reference time signal, and to determine three-dimensional coordinates of the measurement part of said object based on said rotation angle of said monopod, said attitude detection result, a distance of said surveying instrument main body from the lower end of said monopod, said calculated measuring direction in the distance measurement, and a measurement result of said distance measuring unit which correspond to the same reference time.

4. The surveying instrument according to claim 3, wherein said optical axis deflector includes a pair of independently rotatable optical prisms, and is configured to determine the deflecting direction and a deflection angle of said distance measuring optical axis based on the rotating positions of said pair of optical prisms and a relative rotation angle between said pair of optical prisms, said measuring direction detecting module detects the deflecting direction and the deflection angle of said distance measuring optical axis based on the rotating positions and the relative rotation angle of said pair of optical prisms, said distance measuring unit continuously projects a distance measuring light which is pulsed light, and said arithmetic control module is configured to control rotations of said pair of optical prisms of said optical axis deflector, to continuously deflect said distance measuring optical axis, to perform a two-dimensional scan by said distance measuring light in a necessary scan pattern, to perform the distance measurement every pulsed light along said scan pattern, to associate the distance measurement result with said reference time signal, associates the deflecting direction and the deflection angle detected by said measuring direction detecting module with said reference time signal, and to acquire three-dimensional data along said scan pattern.

5. The surveying instrument according to claim 4, wherein when a change in detection result of said attitude detector exceeds a predetermined threshold value, a distance measurement operation before and after the exceedance of said threshold value is stopped.

6. The surveying instrument according to claim 4, wherein said scan pattern is set in such a manner that said scan pattern extends over said first image and said second image, and said arithmetic control module is configured to synthesize said first image and said second image based on three-dimensional coordinates acquired along said scan pattern.

7. The surveying instrument according to claim 2, further comprising a display unit such that the measurement part of said object is displayed on an image of said object.

8. The surveying instrument according to claim 2, wherein said arithmetic control module is configured to detect outputs from an attitude detector at the predetermined time intervals, to obtain a tilt change of said main body with respect to a time, and to calculate an average tilt change in a predetermined time.

9. The surveying instrument according to claim 1, further comprising a display unit such that the measurement part of said object is displayed on an image of said object.

10. The surveying instrument according to claim 1, wherein said arithmetic control module is configured to detect outputs from an attitude detector at the predetermined time intervals, to obtain a tilt change of said main body with respect to a time, and to calculate an average tilt change in a predetermined time.

* * * * *